US011337523B2

(12) United States Patent
David

(10) Patent No.: US 11,337,523 B2
(45) Date of Patent: May 24, 2022

(54) UNIVERSAL AUTOMATIC SELF-LEVELING MECHANISM FOR MOTORIZED CHAIR SEATS

(71) Applicant: Steven W. David, Anthem, AZ (US)

(72) Inventor: Steven W. David, Anthem, AZ (US)

( * ) Notice: Subject to any disclaimer, the term of this patent is extended or adjusted under 35 U.S.C. 154(b) by 32 days.

(21) Appl. No.: 16/939,428

(22) Filed: Jul. 27, 2020

(65) Prior Publication Data

US 2021/0022505 A1    Jan. 28, 2021

Related U.S. Application Data

(60) Provisional application No. 62/878,619, filed on Jul. 25, 2019.

(51) Int. Cl.
*A47C 1/024* (2006.01)
*B60N 2/39* (2006.01)

(52) U.S. Cl.
CPC .............. *A47C 1/0242* (2013.01); *B60N 2/39* (2013.01)

(58) Field of Classification Search
CPC ................................ A47C 1/0242; B60N 2/39
See application file for complete search history.

(56) References Cited

U.S. PATENT DOCUMENTS

| 5,857,535 | A | * | 1/1999 | Brooks | B60N 2/39 180/41 |
|---|---|---|---|---|---|
| 6,068,280 | A | | 5/2000 | Torres | |
| 2013/0113256 | A1 | * | 5/2013 | Allen | B60N 2/39 297/344.1 |
| 2014/0151157 | A1 | * | 6/2014 | Hall | B66B 9/0807 187/202 |
| 2020/0346563 | A1 | * | 11/2020 | Lorey | B60N 2/10 |

* cited by examiner

*Primary Examiner* — David R Dunn
*Assistant Examiner* — Tania Abraham
(74) *Attorney, Agent, or Firm* — Schmeiser, Olsen & Watts LLP

(57) ABSTRACT

An electro-mechanical automatic self-leveling device is provided for use on motorized chair seats. The device may include a pendulum assembly consisting of neodymium magnets attached to an inertia-dampened pendulum and a printed circuit board (PCB) with a hall effect sensor and processing circuitry that will develop proportional correction signals to be amplified by a high-current bi-directional motor driver. This configuration is assembled in a case attached to the motorized chair seat via a mounting bracket and clamping knob, and a cable from the device connects to the chair's seat tilt motor and power supply. Various switches may be included to reset the device in case of overheating and to switch between automatic and manual leveling. In alternative embodiments, the auto-leveling mechanism may be integrated into the motorized chair seat design rather than a separate device that can be attached to the chair seat after-market and independent of the chair's controller.

10 Claims, 3 Drawing Sheets

UNIVERSAL AUTOMATIC SELF-LEVELING MECHANISM FOR MOTORIZED CHAIR SEATS

CROSS REFERENCE TO RELATED APPLICATION[S]

This application claims priority to U.S. Provisional Patent Application entitled "UNIVERSAL AUTOMATIC SELF-LEVELING MECHANISM FOR MOTORIZED CHAIR SEATS," Ser. No. 62/878,619, filed on Jul. 25, 2019, the disclosure of which is incorporated entirely herein by reference.

BACKGROUND OF THE INVENTION

Technical Field

This invention relates to an automatic seat-leveling device, and more particularly to a self-leveling mechanism that mounts onto basic (i.e., non-self-leveling) chairs with motorized tilting seats to replicate the functionality of integrated (i.e., self-leveling) power tilting chairs.

State of the Art

Motorized vehicles such as cars, boats, backhoes, power wheelchairs, and lawnmowers can be equipped with motors to level the seat, making it more comfortable for the seat occupant as the angle of the vehicle changes. Typically, the occupant uses an input device (e.g., a rocker switch) to operate the motor to change the angle of the seat. Because these seat-leveling mechanisms require manual operation, it inhibits other simultaneous activities, making it inconvenient. In addition, manual operation is not feasible for people with certain physical limitations. Such individuals frequently experience fear of losing their balance, which can occur over uneven terrain or during rapid acceleration or deceleration of their chair.

Automatic self-leveling mechanisms for motorized chair seats have been created to overcome these issues but their design has several problems. First, the type of level-sensing mechanism can be problematic. For example, a pendulum with a mechanically coupled position sensor such as a potentiometer suffers from drag on the pendulum, making it non-responsive at zero point. Change in terrain is initially undetected because it is insufficient to overcome friction on the pendulum, causing a delay in engaging the seat tilt motor. Where the level-sensing mechanism is a gyroscope, accelerometer, or MEMS device, shocks such as hitting a rock or other type of bump and temperature fluctuations can cause the mechanism to lose calibration, which can take time to recalibrate under inconvenient circumstances, or otherwise malfunction. Many self-leveling devices are therefore faulty due to the use of inadequate level-sensing mechanisms.

The second issue is the use of non-proportional correction. Processing circuitry that involves on-off/digital actuation introduces overshoot; the pendulum assembly overcompensates, resulting in oscillation. This issue is compounded by pendulum drag.

Third, the design does not address sudden speed changes, which can cause the chair occupant to feel unbalanced. The first two issues may in fact contribute to balance concerns.

In addition, prior designs have integrated the automatic self-leveling mechanism into the chair assembly, often through the chair's controller, limiting the ability to add this functionality to existing power tilting chairs that lack automatic self-leveling.

Accordingly, there is a need for an improved automatic self-leveling mechanism that is universally applicable to power tilting chairs, uses a zero-drag positional sensing method, employs proportional correction, withstands impacts and temperature fluctuations, and improves balance control.

DISCLOSURE OF THE INVENTION

Embodiments of the invention provide an electro-mechanical design for automatically leveling a motorized chair seat as its angle changes relative to a pre-determined position or angle. In an alternative embodiment, two devices may be used to level a chair seat in two directions (i.e., forwards/backwards and side-to-side). In addition, the auto-leveling mechanism may be integrated into the motorized chair seat design or encased as a separate device that may be attached to the chair seat with a mounting bracket/clamp.

Existing mechanical design problems include non-proportional correction and drag on the pendulum. In the present invention, automatic leveling is achieved through a device clamped to or integrated in the chair seat, where a positioning sensor registers angular changes, activating the motors to engage proportionally to the correction needed.

Aspects of the present invention include the following:
1. Use of variable magnetic fields (e.g., a hall effect sensor and neodymium magnets) to detect changes in the angle of the chair's seat. There is no physical attachment to the pendulum, thus reducing or eliminating drag. A lighter pendulum weight can therefore be used.
2. Use of processing circuitry to generate proportional correction relative to the degree of error to engage the chair's seat tilt motor without overcorrecting or causing oscillation.
3. Use of tuned, high viscosity silicone fluid dampener on the pendulum, in combination with a lighter pendulum weight (i.e., lower inertial mass), to reduce the impact of shocks.
4. The mechanism may be integrated into a motorized chair seat design or may be assembled as a separate device with a mounting bracket, allowing its use with existing motorized chair seats as an after-market add-on independent of the chair's controller.

The auto-leveling mechanism of the current invention is comprised of a pendulum assembly; processing circuitry that will develop proportional correction signals to be amplified by a high-current bi-directional motor driver; and a case, used also as a heat sink. A mounting bracket and clamping knob may be used to attach the case to the chair seat, and cables from the device connect to the chair seat motor. A reset switch may be included to reset the device in case of overheating; and a switch may be included for switching between automatic and manual leveling. In an alternative embodiment, two auto-leveling mechanisms can be attached to a single chair seat with two motors, one for the forward/backward tilt motor and one for the left/right tilt motor, to level the chair in two directions.

A principal advantage of the invention resides in the improved auto-leveling mechanism as a result of 1) the use of variable magnetic fields resulting in a zero-drag pendulum and 2) proportional correction relative to the degree of error detected by the positional sensor.

Still another advantage of the invention resides in its resistance to physical shocks and temperature fluctuations.

Still another advantage of the invention resides in the ability to mount the auto-leveling device to power tilting chairs that lack automatic self-leveling and bypassing the chair's controller. A separate cable can be developed for each chair model, which may have different connectors to the seat tilt motor and power supply.

Yet another advantage of the invention resides in the improved sense of balance resulting from inertial compensation, which gently presses the chair occupant forward into acceleration and backward during deceleration, especially during rapid or sudden speed changes.

The foregoing and other features and advantages of the present invention will be apparent from the following more detailed description of the particular embodiments of the invention, as illustrated in the accompanying drawings.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF EMBODIMENTS OF THE INVENTION

Figure 1:
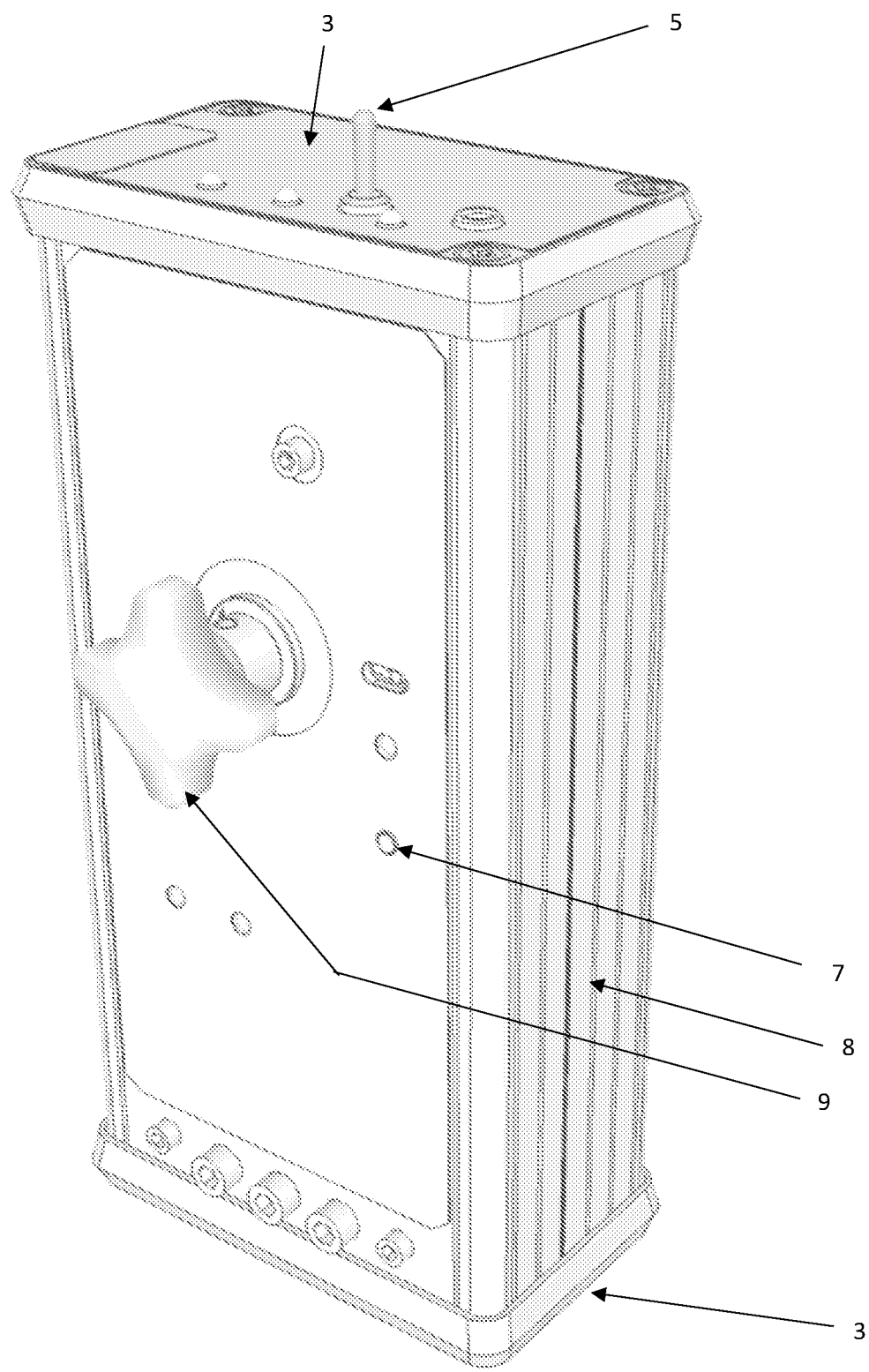
FIG. 1 is an assembled general front view of an auto-leveling mechanism in accordance with the present invention.
Figure 2:
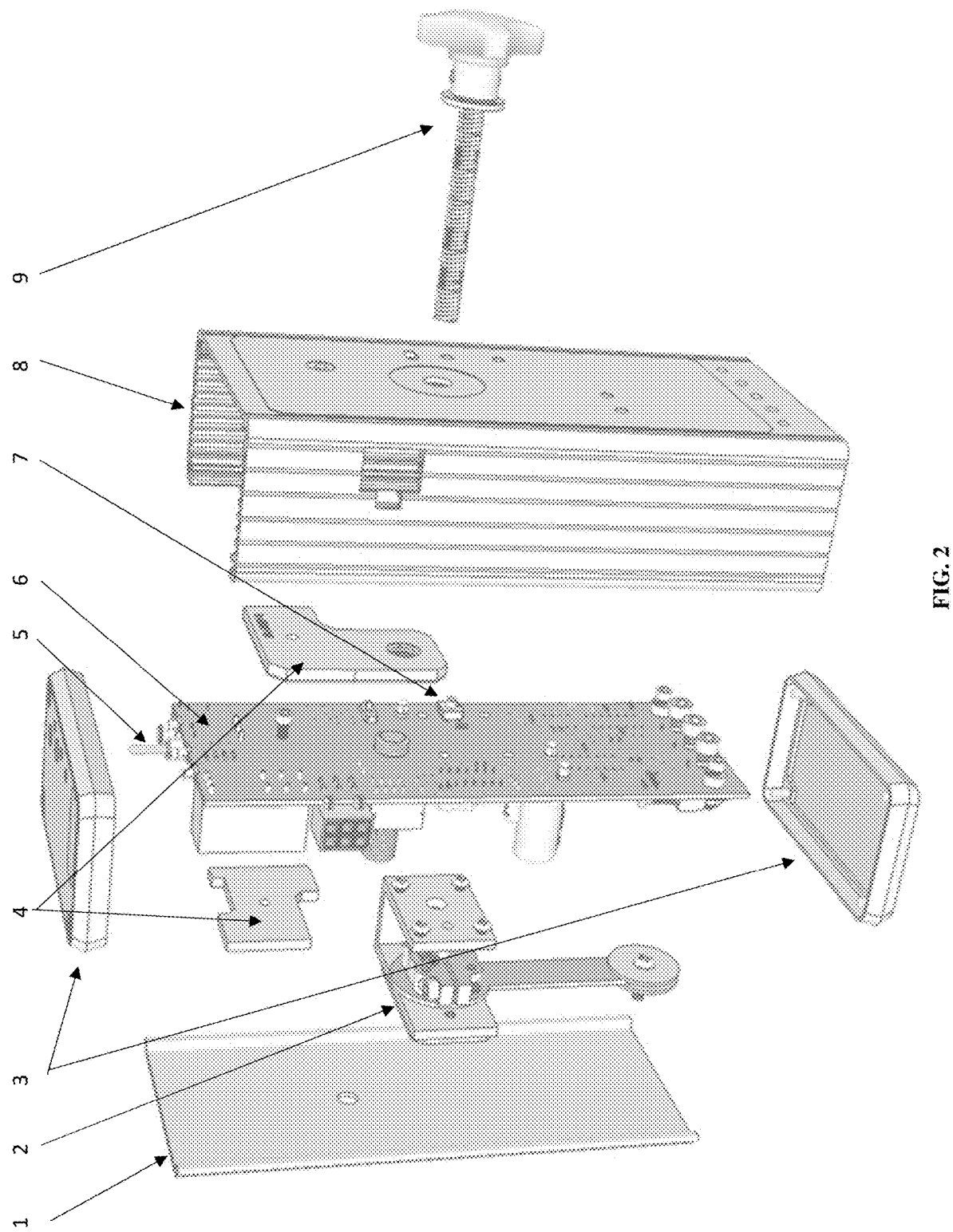
FIG. 2 is an exploded view of an auto-leveling mechanism in accordance with the present invention.
Figure 3:
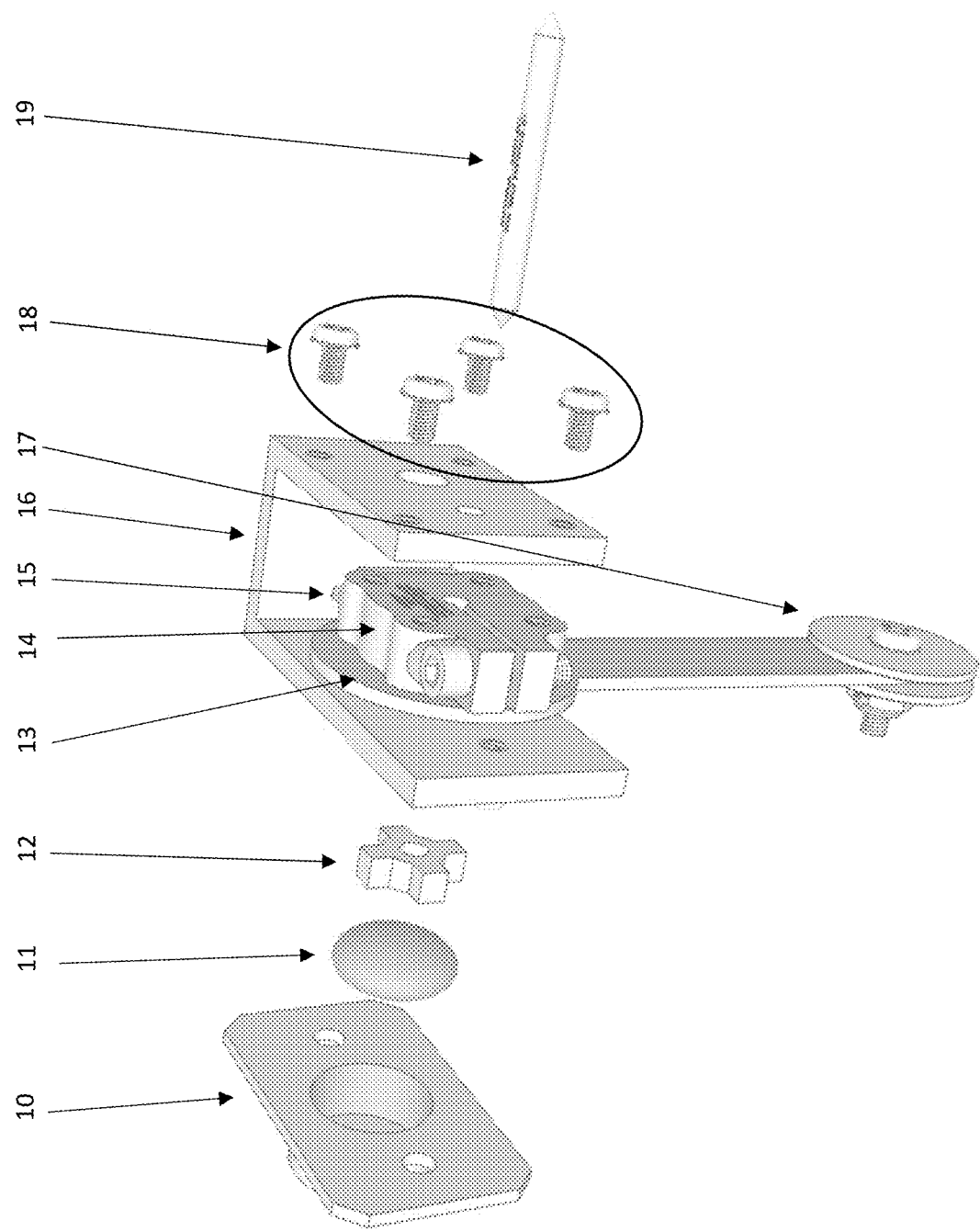
FIG. 3 is an exploded view of a pendulum assembly in accordance with the present invention.

As discussed above, embodiments of the present invention relate to an electro-mechanical design for an automatic self-levelling mechanism for motorized chair seats Referring to the drawings, FIGS. 1-3 depict a front view of an assembled auto-leveling mechanism, an exploded view of an auto-leveling mechanism, and an exploded view of a pendulum assembly in accordance with the present invention. The auto-leveling mechanism may include an inertia-dampened pendulum assembly 2 attached to a printed-circuit board (PCB) 6 with heat sinks 4 enclosed in a case that may be comprised of a case front 8, case rear plate 1, and case end plates 3 and attached to a chair frame via a clamping knob 9.

The pendulum assembly 2 may include a bracket 16, a pendulum 13, and weight 17. An axle pin 19 extends through the bracket 16 and pendulum. The clamping hub 14 attached to the pendulum 13 clamps to the axle pin 19. The damper paddle 12 press-fits onto the axle pin 19. Silicone fluid 11 is inserted into the damper cover 10, which attaches to the bracket 16. Mounting hardware 18 attaches the bracket 16 and therefore the pendulum assembly 2 to the PCB 6. A magnet 15, such as neodymium magnet, is affixed to the clamping hub 14 such that when the pendulum assembly 2 is mounted to the PCB 6, the magnet 15 is aligned over a hall effect sensor on the PCB 6.

Operation of the automatic self-leveling mechanism provides many advantages. For example, and without limitation, use of variable magnetic fields (e.g., a hall effect sensor and neodymium magnets) to detect changes in the angle of the chair's seat. There is no physical attachment to the pendulum, thus reducing or eliminating drag. A lighter pendulum weight can therefore be used; use of processing circuitry to generate proportional correction relative to the degree of error (i.e. the degree between the angle of the chair's seat and level) to engage the chair's seat tilt motor without overcorrecting or causing oscillation; use of tuned, high viscosity silicone fluid dampener on the pendulum, in combination with a lighter pendulum weight (i.e., lower inertial mass), to reduce the impact of shocks; and the mechanism may be integrated into a motorized chair seat design or may be assembled as a separate device with a mounting bracket, allowing its use with existing motorized chair seats as an after-market add-on independent of the chair's controller.

A principal advantage of the invention resides in the improved auto-leveling mechanism as a result of 1) the use of variable magnetic fields resulting in a zero-drag pendulum and 2) proportional correction relative to the degree of error detected by the positional sensor. Additional advantages may include the mechanisms resistance to physical shocks and temperature fluctuations; the ability to mount the auto-leveling device to power tilting chairs that lack automatic self-leveling and bypassing the chair's controller; a separate cable can be developed for each chair model, which may have different connectors to the seat tilt motor and power supply; and an improved sense of balance resulting from inertial compensation, which gently presses the chair occupant forward into acceleration and backward during deceleration, especially during rapid or sudden speed changes.

The auto-levelling mechanism may further include an auto/manual switch 5 and a reset switch 7 in case of overheating.

Accordingly, the components defining any automatic motorized seat-leveling mechanism according to embodiments of the invention may be formed of any of many different types of materials or combinations thereof that can readily be formed into shaped objects provided that the components selected are consistent with the embodiments of the invention. For example, the components may be formed of: metals, such as zinc, magnesium, titanium, copper, iron, steel, carbon steel, alloy steel, tool steel, stainless steel, aluminum, any combination thereof, and/or other like materials; alloys, such as aluminum alloy, titanium alloy, magnesium alloy, copper alloy, any combination thereof, and/or other like materials; rubbers (synthetic and/or natural) and/or other like materials; glasses (such as fiberglass) carbon-fiber, aramid-fiber, any combination thereof, and/or other like materials; polymers such as thermoplastics (such as ABS, Fluoropolymers, Polyacetal, Polyamide; Polycarbonate, Polyethylene, Polysulfone, and/or the like), thermosets (such as Epoxy, Phenolic Resin, Polyimide, Polyurethane, Silicone, and/or the like), any combination thereof, and/or other like materials; composites and/or other like materials; any other suitable material; and/or any combination thereof.

Furthermore, the components defining any auto-leveling mechanism according to embodiments of the invention may be purchased pre-manufactured or manufactured separately and then assembled together. However, any or all of the components may be manufactured simultaneously and integrally joined with one another. Manufacture of these components separately or simultaneously may involve extrusion, pultrusion, vacuum forming, injection molding, blow molding, resin transfer molding, casting, forging, cold rolling, milling, drilling, reaming, turning, grinding, stamping, cutting, bending, welding, soldering, hardening, riveting, punching, plating, and/or the like. If any of the components are manufactured separately, they may then be coupled with one another in any manner, such as with adhesive, a weld, a fastener (e.g. a bolt, a nut, a screw, a nail, a rivet, a pin, and/or the like), wiring, any combination thereof, and/or the like for example, depending on, among other considerations, the particular material forming the components. Other possible steps might include sand blasting, polishing, powder coating, zinc plating, anodizing, hard anodizing, and/or painting the components for example.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims.

The invention claimed is:

1. An automatic self-leveling mechanism for a motorized chair seat, the mechanism comprising:
   a pendulum assembly comprising a pendulum with a weight coupled to an end of the pendulum opposite an end coupled to an axle pin, and a magnet coupled to the pendulum adjacent the axle pin;
   processing circuitry comprising a hall effect sensor, the processing circuitry coupled to the pendulum assembly wherein the magnet of the pendulum assembly is aligned over the hall effect sensor; and
   a case that retains the pendulum assembly and processing circuitry, wherein:
      the automatic self-leveling mechanism is coupled to a chair seat tilt motor of the motorized chair seat;
      the pendulum rotates about an axis of the axle pin in response to change in angle of the motorized chair seat and the hall effect sensor detects changes in the angle of the chair seat in response to variations in the magnetic field of the magnet sensed by the hall effect sensor; and
      the processing circuitry generates proportional correction relative to a degree of error to engage the chair seat tilt motor without overcorrecting or causing oscillation.

2. The mechanism of claim 1, wherein the case operates as a heat sink.

3. The mechanism of claim 1, wherein the pendulum assembly further comprises a bracket, wherein the axle pin extends through the bracket and pendulum.

4. The mechanism of claim 3, wherein the pendulum assembly further comprises a clamping hub attached to the pendulum that clamps to the axle pin.

5. The mechanism of claim 4, wherein the pendulum assembly further comprises a damper paddle coupled onto the axle pin and a damper cover that is coupled to the bracket, wherein silicone fluid is inserted into the damper cover to reduce impact of shocks.

6. The mechanism of claim 1, further comprising a mounting bracket and clamping knob to attach the case to the chair seat, and cables to connect to the chair seat motor.

7. The mechanism of claim 1, further comprising a reset switch to reset the device in case of overheating.

8. The mechanism of claim 1, further comprising a switch for switching between automatic and manual leveling.

9. The mechanism of claim 1, further comprising two auto-leveling mechanisms attached to a single chair seat with two motors, one motor for a forward/backward tilt and one motor for a left/right tilt, to level the chair in two directions.

10. The mechanism of claim 1, wherein the mechanism is integrated into the motorized chair seat or is a separate device mounted to the motorized chair seat as an aftermarket add-on independent of a controller of the motorized char seat.

* * * * *